United States Patent
Yoshikawa et al.

(10) Patent No.: US 6,632,319 B1
(45) Date of Patent: *Oct. 14, 2003

(54) PROCESS FOR PRODUCING RUBBER-BASED COMPOSITE MATERIAL

(75) Inventors: Masato Yoshikawa, Kodaira (JP); Nobuko Kato, Kodaira (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,156

(22) Filed: Apr. 10, 1998

(30) Foreign Application Priority Data

Apr. 15, 1997 (JP) .............................. 9-113508

(51) Int. Cl.$^7$ ................................. C09J 5/02
(52) U.S. Cl. ................ 156/319; 156/151; 156/325
(58) Field of Search ................... 156/325, 151, 156/319; 204/192.14, 192.1; 428/625

(56) References Cited

U.S. PATENT DOCUMENTS

| | | | | |
|---|---|---|---|---|
| 2,240,805 A | * | 5/1941 | Jemon ..................... | 428/625 |
| 3,961,740 A | * | 6/1976 | Nakamoto et al. ......... | 428/625 |
| 4,096,009 A | * | 6/1978 | Yoshida .................... | 156/151 |
| 4,218,517 A | * | 8/1980 | Van Ooij ................. | 428/625 |
| 4,255,496 A | * | 3/1981 | Haemers .................. | 428/625 |
| 4,297,159 A | * | 10/1981 | Dobias et al. ............ | 156/325 |
| 4,446,197 A | * | 5/1984 | Benko ...................... | 428/625 |
| 4,872,932 A | * | 10/1989 | Yoshikawa et al. ....... | 156/151 |
| 4,978,586 A | * | 12/1990 | Chambaere et al. ...... | 428/625 |

FOREIGN PATENT DOCUMENTS

| | | |
|---|---|---|
| JP | 62-87311 | 4/1987 |
| JP | 62-189117 | 8/1987 |
| JP | 62-246278 | 10/1987 |
| JP | 1-290342 | 11/1989 |
| JP | 03-220241 | 9/1991 |
| JP | 8-296032 | * 11/1996 |

OTHER PUBLICATIONS

"Patent Abstracts of Japan", vol. 015, No. 504, Dec. 19, 1991 & JO 03 220242A (Bridgestone Corp).

"Patent Abstracts of Japan", vol. 015, No. 504, Dec. 19, 1991 & JP 03 220241A (Bridgestone Corp).

* cited by examiner

Primary Examiner—Geoffrey L. Knable
(74) Attorney, Agent, or Firm—Sughrue Mion, PLLC

(57) ABSTRACT

A process for producing a rubber-based composite material including steps of laminating a rubber compound onto a substrate, with a bonding layer of metal or metal compound interposed therebetween, and subsequently vulcanizing the rubber compound, characterized in that vulcanization is carried out by controlling the composition of the rubber compound and the amount of metal in the bonding layer such that the following equation is established:

$$x-19 \geq y \geq 0.2x-12$$

wherein x is the amount (atom %) of metal in the bonding layer, and y is the slope (kgf·cm/min) of the vulcanization curve of the rubber compound. The rubber based composite material retains good bond strength even when used in such a way that its bond interface is in contact with water. In addition, it has good adhesion to a substrate treated by conversion treatment.

3 Claims, 1 Drawing Sheet

PROCESS FOR PRODUCING RUBBER-BASED COMPOSITE MATERIAL

BACKGROUND OF THE INVENTION

The present invention relates to a process for producing a rubber-based composite material which has good adhesion between a rubber layer and a substrate.

Rubber-metal composite materials have been widely used as, for example, rubber vibration insulators. They need (firm) (rubber-to-metal bonding.)

In view of the foregoing, the present applicant proposed in Japanese Patent Laid-open Nos. 87311/1987 and 246278/1987 a process for producing a rubber composite material which is characterized by coating the substrate with a thin film of cobalt or cobalt alloy by "dry plating", thereby achieving firm bonding between rubber and substrate at the time of vulcanization. In addition, the present applicant disclosed in Japanese Patent Laid-open No. 290342/1989 that the rubber composite material is improved in durability (resistance to wet heat deterioration) if the cobalt is oxidized when the cobalt film is formed or after the cobalt film has been formed.

Moreover, the present applicant proposed in Japanese Patent Laid-open No. 296032/1996 correspoding to the (U.S. Patent application Ser. No. 08/634,792) a method for preparing a rubber composite material comprising the steps of forming a thin film of cobalt oxide on a substrate, forming a rubber composition on the thin film, and vulcanizing the rubber composition, said step of forming a thin film of cobalt oxide comprising sputtering a target of cobalt in the presence of an inert gas and a gas having molecular oxygen with an input power which is at least the transition point at which an input voltage between the target and the substrate abruptly rises when an input power is supplied to the target from a DC supply.

This process yields a rubber-based composite material which exhibits good adhesion under the wet heat condition owing to the cobalt oxide (CoOx) film formed in the oxygen gas stream.

(Further,) a rubber-based composite material (such as rubber vibration insulator) often has its bonding interface exposed, and there is a possibility of the bonding interface coming into direct contact with water. In anticipation of such incidences, the composite material undergoes test for adhesive failure under a wet condition.

The rubber-based composite material having a cobalt oxide film on a metal substrate experiences peeling in the test for adhesive failure as soon as the bonding interface is (expose) to water, although it exhibits good adhesion (with rupture occurring always only in rubber) in the ordinary test for adhesive failure. There has been a demand for solution to this problem.

SUMMARY OF THE INVENTION

Therefore, it is an object of the present invention to provide a process for producing a rubber-based composite material which (exhibits good adhesion) even in the case where the bonding interface comes into contact with water.

In order to achieve the above-mentioned object, the present inventors carried out a series of (extensive research) which led to the following finding. That is, a rubber-based composite material which is formed by laminating a layer of rubber compound onto a substrate, with a bonding layer of metal or metal compound interposed between them and subsequently vulcanizing the rubber compound, exhibits firm bonding between the rubber layer and the substrate if the rubber compound is vulcanized, with the composition of the rubber compound and the amount of metal in the bonding layer are controlled such that the rate of vulcanization of the rubber compound coincides with the rate of reaction of the bonding layer, to be more specific, the following equation is established:

$$x-19 \geq y \geq 0.2x-12$$

wherein x is the amount (atom %) of metal in the bonding layer, and y is the slope (kgf·cm/min) of the vulcanization curve of the rubber compound.

(The process under the above-mentioned condition gives the rubber-based composite material improved adhesion in the wet state and also stable adhesion even in the case where the amount of sulfur (as the vulcanizer) and the amount of vulcanization accelerator fluctuate. This effect is significant in the system with a high vulcanization rate. The present invention is based on this finding.)

The present invention provides a process for producing a rubber-based composite material comprising steps of laminating a rubber compound onto a substrate, with a bonding layer of metal or metal compound interposed therebetween, and subsequently vulcanizing the rubber compound, characterized in that vulcanization is carried out by controlling the composition of the rubber compound and the amount of metal in the bonding layer such that the following equation is established:

$$x-19 \geq y \geq 0.2x-12$$

wherein x is the amount (atom %) of metal in the bonding layer, and y is the slope (kgf·cm/min) of the vulcanization curve of the rubber compound.

DESCRIPTION OF THE PREFERRED EMBODIMENTS

Figure 1:
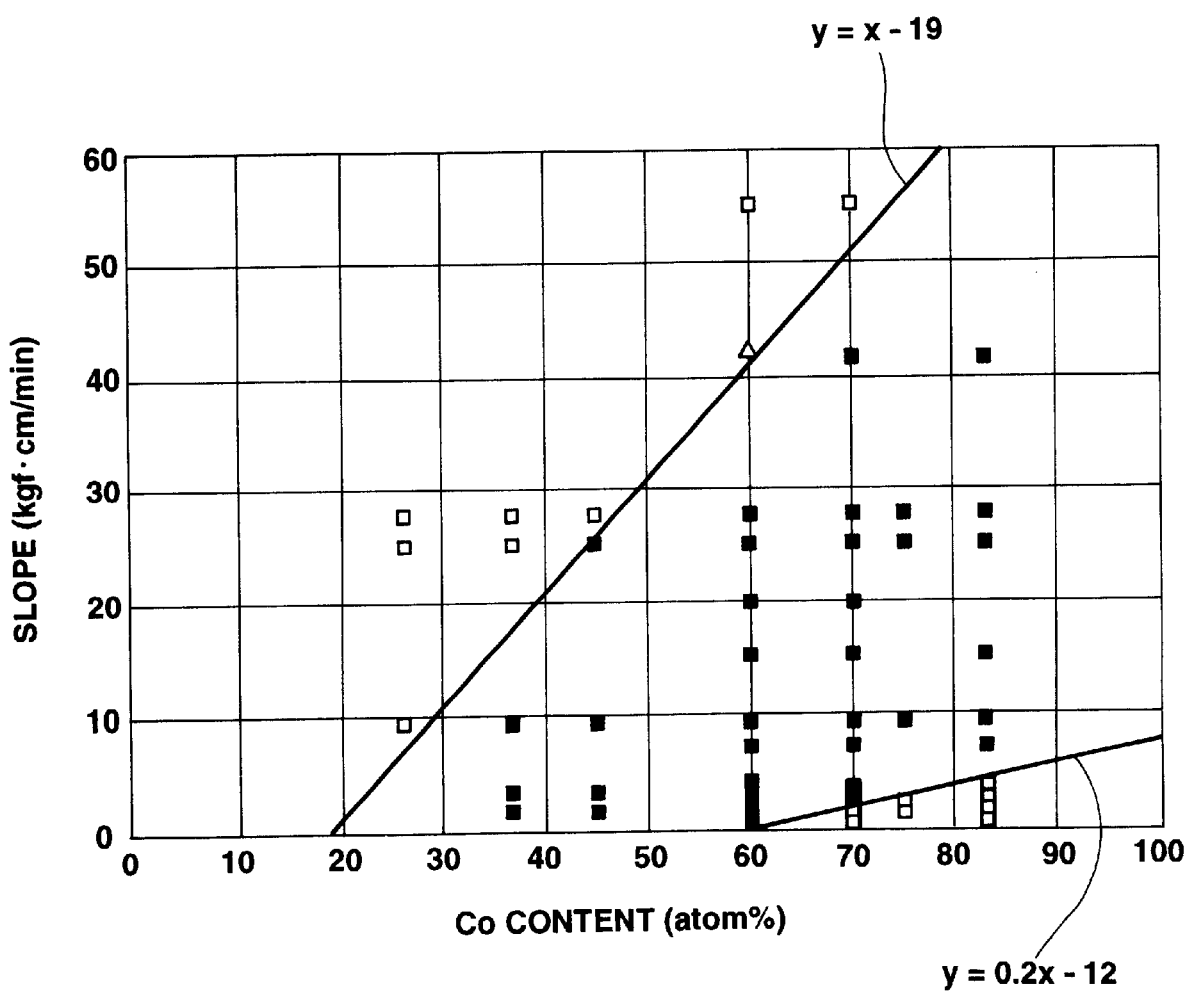
FIG. 1 is a graph showing (in terms of rubber failure %) the relation between (the degree of oxidation of cobalt oxide) and the slope of the rubber vulcanization curve.

The rubber-based composite material of the present invention is (not specifically restricted in its substrate, which may be made of metal, ceramics, or plastics.) Metal includes, for example, steel, stainless steel, titanium alloy, aluminum, aluminum alloy, copper, copper alloy, zinc, zinc alloy, and amorphous alloy. The choices of these materials such as metal, ceramics and plastics and the size and shape of the substrate depend on the intended use of the composite material.

The process of the present invention should (preferably) be applied to a (steel substrate with zinc phosphating treatment or any other chemical conversion treatment.)

(The rubber compound to be laminated onto the substrate according to the present invention (should be) based on one or more than one kind of natural rubber (NR) or synthetic rubber having carbon-carbon double bonds in the structural formula.)

Examples of the synthetic rubber include the following.
(1) Homopolymers of conjugated diene compound such as isoprene, butadiene, and chloroprene. Examples include polyisoprene rubber (IR), polybutadiene rubber (BR), and polychloroprene rubber.
(2) Copolymers of said conjugated diene compound with a vinyl compound such as styrene, acrylonitrile, vinylpyridine, acrylic acid, methacrylic acid, alkyl acrylate, and alkyl methacrylate. Examples include styrene-butadiene copolymer rubber (SBR), vinylpyridine butadiene styrene copolymer rubber, acrylonitrile butadiene copolymer rubber, acrylic acid butadiene copolymer rubber, methacrylic acid butadiene copolymer rubber, methyl acrylate butadiene copolymer rubber, and methyl methacrylate butadiene copolymer rubber.

(3) Copolymers of olefin (such as ethylene, propylene, and isobutylene) with diene compound. Examples include isobutylene-isoprene copolymer rubber (IIR).

(4) Copolymers (EPDM) of olefin with non-conjugated diene. Examples include ethylene-propylene-cyclopentadiene terpolymer, ethylene-propylene-5-ethylidene-2-norbornene terpolymer, and ethylene-propylene-1,4-hexadiene terpolymer.

(5) Polyalkenamer obtained by ring opening polymerization of cycloolefin. Examples include polypentenamer.

(6) Rubber obtained by ring opening polymerization of oxirane. Examples include polyepichlorohydrin rubber vulcanizable with sulfur.

(7) Polypropylene oxide rubber.

Additional examples include their halides, such as chlorinated isobutylene-isoprene copolymer rubber (Cl-IIR) and brominated isobutylene-isoprene copolymer rubber (Br-IIR). Other examples include polymers obtained by ring opening polymerization of norbornane. The above-mentioned rubber may be blended with a saturated elastomer such as epichlorohydrin rubber, polypropylene oxide rubber, and chlorosulfonated polyethylene.

The rubber compound used in the present invention should be incorporated with a (vulcanizing agent such as sulfur, organic sulfur compound) and the other crosslinking agents in an (amount of 0.01–10 parts by weight,) (Preferably) 0.1–6 parts by weight, and a (vulcanization accelerator) in an (amount of 0.01–10 parts by weight,) (Preferably) 0.1–5 parts by weight, (for 100 parts by weight of the above-mentioned rubber component.) A preferred example of the vulcanization accelerator is N-cyclohexyl-2-benzothiazylsulphenamide (CZ). It reduces the vulcanizing time.

(The rubber compound used in the present invention should preferably be incorporated with process oil, mineral oil, or vegetable oil.) Process oil includes paraffinic process oil, naphthenic process oil, and aromatic process oil. Mineral oil includes ethylene-$\alpha$-olefin cooligomer, paraffin wax, and liquid paraffin. Vegetable oil includes castor oil, cottonseed oil, linseed oil, rapeseed oil, soybean oil, palm oil, coconut oil, and peanut oil. These (oils improve the bonding under wet heat conditions of the rubber to the cobalt oxide thin film in the case where the rubber compound is incorporated with CZ.) The amount of the oil should be 3–50 parts by weight, preferably 4–10 parts by weight, for 100 parts by weight of the rubber component. With an amount less than specified above, the oil does not produce the effect of improving the bonding under wet heat conditions. With an amount more than specified above, the oil greatly changes the spring properties of the rubber. In the case of rubber vibration insulator, an excess amount of oil greatly changes tan 5 which is an important factor to dampen vibrations.

The rubber compound used in the present invention may be incorporated in the usual way with fillers (such as carbon black, silica, calcium carbonate, calcium sulfate, clay, and mica) and accelerator activator (such as zinc oxide and stearic acid) according to its intended use. Incidentally, the process of the present invention does not necessarily require an organic cobalt salt to promote adhesion between rubber and partly oxidized cobalt.

Bonding between the rubber compound and the substrate is accomplished by heating under pressure. Vulcanization may be carried out in the usual way by the aid of sulfur or an organic sulfur compound such as dithiomorpholine and thiuram. (The amount of sulfur or sulfur in the organic sulfur compound should be 0.5–7 parts by weight, preferably 1–6 parts by weight, for 100 parts by weight of the rubber component.) The condition of vulcanization is not specifically restricted although heating at 155° C. for 20 minutes is preferred.

The process of the present invention is characterized in that the rubber compound incorporated with a large amount (e.g., 5–6 parts by weight) of sulfur (provides firm bonding between rubber and substrate) even though it undergoes vulcanization for a long time. Therefore, the process of the present invention can be widely applied to the production of rubber-based composite materials such as tires, power transmission belts, conveyor belts, and hoses which have metal fibers as the core and other various rubber products and parts such as rubber vibration insulator, antiseismic rubber, rubber crawler, rubber screen, and rubber roll.

According to the process of the present invention, bonding between the rubber layer and the substrate is accomplished, with a bonding layer of metal thin film or metal compound thin film interposed therebetween.

(The bonding layer may be formed from such metals as zinc, copper, and cobalt, or alloys or compounds thereof.) (Preferred examples include cobalt, cobalt alloys with Zn, Cu, Cr, Ti, or Ni, with the content of cobalt being higher than 50% by weight, particularly higher than 70% by weight, and cobalt oxide, nitride, and carbide.) Cobalt oxide, nitride, and carbide may be represented by $CoO_x$, $CoN_y$, and $CoC_z$, respectively, with x being 0–1.8, preferably 0–1.6, y being 0–1.6, preferably 0–1.4, and z being 0–3.2, preferably 0–2.8.

The thickness of the bonding layer is not specifically restricted. It is usually 10 Å to 100 $\mu$m, preferably 50 Å to 1 $\mu$m.

(The bonding layer may be formed in any manner depending on its kind. For example, the bonding layer may be formed by vapor plating, such as vacuum deposition, ion plating, DC magnetron sputtering, diode sputtering, rf sputtering, (plasma CVD.) The bonding layer of cobalt oxide, nitride, or carbide may be formed by using a cobalt target and applying DC power to the target in an inert gas (such as He, Ar, etc.) containing 02 (or oxygen compound), $N_2$ (or nitrogen compound), or $CH_4$ (or carbon compound), respectively. The details of this process will be found in Japanese Patent Laid-open No. 296032/1996 or the U.S. patent application Ser. No. 08/634,792.

According to the present invention, the rubber compound and the bonding layer are formed by controlling the conditions in such a way that the following equation is satisfied.

$$x-19 \geq y \geq 0.2x-12$$

particularly, $$0.8x-19 \geq y \geq 0.25x-12$$

wherein x is the amount (atom %) of metal in the bonding layer, and y is the maximal point (kgf·cm/min) of the slope of the vulcanization curve of the rubber compound, said slope representing the relation between the torque of the rubber compound at a prescribed temperature (that is, 155° C.) and time.

In this case, (the slope of the vulcanization curve of the rubber compound can be controlled by adequately selecting the amount of sulfur and vulcanization accelerator.) The amount of metal in the bonding layer can be controlled by varying the amount of the (reactive gas) to be introduced into the inert gas during sputtering. For example, if the bonding layer of cobalt or cobalt oxide is to be formed by sputtering in argon or any other inert gas using a cobalt target, the amount of (oxygen, ozone, air, or water, or any other gas having oxygen atoms to be introduced into the inert gas) should be properly selected so that the resulting cobalt oxide has a desired degree of oxidation defined by x=0–1.8, particularly 0–1.6, in CoOx.

Incidentally, it is possible to perform sputtering in the present invention such that the value of x (or the amount of metal or oxygen) in the above-mentioned equation is achieved according to the vulcanization curve under the specific vulcanization condition (particularly vulcanization temperature) of the rubber compound to be used. Needless to say, it is also possible to achieve the same goal by selecting an adequate composition of the rubber compound according to the composition of the bonding layer to be formed.

(The process of the present invention does not preclude forming a prime coating film) 10 Å to 10 µm thick, preferably 20 Å to 1 µm thick between the substrate and the bonding layer. (The prime coating film may be formed from an organic material, aluminum, or cobalt oxide more oxidized than that used for the bonding layer.) It improves the bond strength under wet conditions and greatly enhances adhesion to metal having film of chemical conversion, for example, steel with zinc phosphate film.

EXAMPLE

The invention will be described in more detail with reference to the following example, which is not intended to restrict the scope thereof.

Example

A piece of (aluminum sheet measuring 10×75×0.5 mm was used as a substrate.) The surface of the substrate was washed with acetone and subjected to low-pressure argon plasma treatment at 13.56 MHz and 100 W, for 5 minutes. (On the substrate was formed a cobalt oxide film by sputtering) under the following conditions.

Target: cobalt

Flow rate of argon gas: 18 ml/min

Flow rate of oxygen gas:
  enough for the amount of cobalt (atom %) as shown in Table 1

Power applied to the target:
  enough for the amount of cobalt (atom %) as shown in Table 1

On the substrate was stuck an unvulcanized rubber compound specified below, which was subsequently vulcanized at 155° C. to achieve bonding. The vulcanization time was twice the time required for the rubber to reach 90% of the maximal value of its torque calculated from the previously obtained vulcanization curve at the vulcanization temperature of 155° C. The assembly was tested for bond strength in the following manner. The results are shown in Table 1.

| Rubber Compound | |
|---|---|
| Ingredient | Parts by weight |
| Natural rubber | 75 |
| Synthetic polyisoprene | 25 |
| Carbon black | 60 |
| Zinc oxide | 7.5 |
| Antioxidant*[1] | 2 |
| Vulcanization accelerator*[2] | shown in Table 1 |
| Sulfur | 2 |
| Mineral oil | 2 |

*[1] N-phenyl-N'-isopropyl-p-phenylenediamine
*[2] N-cyclohexyl-2-benzothiazylsulphenamide (CZ) or 2-dibenzothiazyl-disulfide (DZ)

Method for Testing Bond Strength:

The bond strength was tested by the T-peel method. The bond test is referred to as "dry test" or "wet test" whether or not the sample is given pure water dropwise during the test. In both tests, the bond strength is rated as best if failure occurs entirely in the rubber layer.

TABLE 1

| Amount of CZ (phr) | Amount of DZ (phr) | Vulcanization time (min) | Slope of vulcanization curve (kgf · cm/min) | Degree of oxidation of cobalt oxide (Co atom %) | | | | | | |
|---|---|---|---|---|---|---|---|---|---|---|
| | | | | 26 | 37 | 45 | 60 | 70 | 75 | 83 |
| | | | | Rubber failure % | | | | | | |
| | 0.25 | 44.8 | 0.5 | | | | 100 | 0 | | 0 |
| | 0.75 | 21.6 | 1.6 | | 100 | 100 | 100 | 10 | 0 | 0 |
| | 1.5 | 17.6 | 2.5 | | 100 | 100 | 100 | 100 | 0 | |
| | 2.25 | 16.4 | 3.3 | | 100 | 100 | 100 | 100 | | 0 |
| | 5.0 | 15.4 | 4.0 | | | | 100 | | | 0 |
| 0.25 | | 28.4 | 1.1 | | | | 100 | 0 | | 0 |
| 0.80 | | 9.2 | 7.5 | | | | 100 | 100 | | 100 |
| 0.75 | | 10.4 | 9.6 | 0 | 100 | 100 | 100 | 100 | 100 | 100 |
| 1.2 | | 7.7 | 15.6 | | | | 100 | 100 | | 100 |
| 1.5 | | 6.6 | 25.0 | 0 | 0 | 100 | 100 | 100 | 100 | 100 |
| 2.25 | | 5.6 | 27.8 | 0 | 0 | 0 | 100 | 100 | 100 | 100 |
| 3.0 | | 5.2 | 41.7 | | | | 50 | 100 | | 100 |
| 5.0 | | 6.8 | 55.6 | | | 0 | 0 | | | |

Table 1 shows the rubber failure % in the wet bond test. FIG. 1 is a graph which is obtained by plotting the amount of metal or the degree of oxidation of cobalt oxide (on the X axis) against the slope of the vulcanization curve (on the Y axis). Thus, FIG. 1 shows the bonding which is achieved when a rubber compound having a certain slope of vulcanization curve is bonded to cobalt oxide having a certain degree of oxidation. Small black squares represent rubber failure 100%, or the best adhesion. Small white squares represent rubber failure 0% and 10%, or the worst adhesion. Small white triangles represent rubber failure 80%. The area occupied by small black squares is one in which stable adhesion is achieved. The upper straight line represents y=x−19, and the lower straight line, y=0.2 x−12. Good adhesion is achieved in the area between these two lines.

As demonstrated above, the present invention provides a rubber-based composite material which retains good bond strength even when used in such a way that its bond interface is in contact with water. In addition, the present invention achieves good adhesion to the substrate treated by chemical conversion.

We claim:

1. A process for producing a rubber-based composite material comprising the steps of laminating a rubber compound onto a substrate, with a bonding layer interposed therebetween and with a primer layer between the substrate and the bonding layer, and subsequently vulcanizing the rubber compound with a vulcanizing agent selected from the group consisting of sulfur and an organic sulfur compound and with a vulcanization accelerator, wherein said rubber compound comprises a vulcanizable natural rubber component and/or synthetic rubber component having carbon-carbon double bonds, the amount of said vulcanizing agent is from 0.01 to 2 parts by weight per 100 parts of the rubber component and said bonding layer comprises cobalt oxide, and wherein in the vulcanization step, the amount of the vulcanizing agent and the vulcanization accelerator are determined so as to control the slope of a vulcanization curve of the rubber compound and the amount of cobalt in the bonding layer is selected to satisfy the following equation:

$$x-19 \geq y \geq 0.2x-12$$

wherein x is the amount (atom %) of cobalt in the bonding layer, and y is the slope (kgf·cm/min) of the vulcanization curve of the rubber compound, thereby obtaining a rubber composition material having an adhesion of rubber failure between the rubber compound and the bonding layer in a wet state, as measured by the T-peel method, of 100%, wherein the primer layer comprises a cobalt oxide more oxidized than the cobalt oxide in the bonding layer.

2. A process for producing a rubber-based composite material comprising the steps of laminating a rubber compound onto a substrate, with a bonding layer of metal or metal compound interposed therebetween and with a primer layer between the substrate and the bonding layer, and subsequently vulcanizing the rubber compound with a vulcanizing agent selected from the group consisting of sulfur and an organic sulfur compound and with a vulcanization accelerator, wherein the primer layer comprises an organic material, wherein said rubber compound comprises a vulcanizable natural rubber component and/or synthetic rubber component having carbon-carbon double bonds, the amount of said vulcanizing agent is from 0.01 to 2 parts by weight per 100 parts of the rubber component and said metal or metal compound is selected from the group consisting of cobalt, cobalt alloys containing higher than 50% by weight of cobalt, cobalt oxides, cobalt nitrides, and cobalt carbides, and wherein in the vulcanization step, the amount of the vulcanizing agent and the vulcanization accelerator are determined so as to control the slope of a vulcanization curve of the rubber compound and the amount of cobalt in the bonding layer is selected to satisfy the following equation:

$$x-19 \geq y \geq 0.2x-12$$

wherein x is the amount (atom %) of cobalt in the bonding layer, and y is the slope (kgf·cm/min) of the vulcanization curve of the rubber compound, thereby obtaining a rubber composition material having an adhesion of rubber failure between the rubber compound and the bonding layer in a wet state, as measured by the T-peel method, of 100%.

3. A process for producing a rubber-based composite material comprising the steps of laminating a rubber compound onto a substrate, with a bonding layer of metal or metal compound interposed therebetween and with a primer layer between the substrate and the bonding layer, and subsequently vulcanizing the rubber compound with a vulcanizing agent selected from the group consisting of sulfur and an organic sulfur compound and with a vulcanization accelerator, wherein the primer layer comprises aluminum, wherein said rubber compound comprises a vulcanizable natural rubber component and/or synthetic rubber component having carbon-carbon double bonds, the amount of said vulcanizing agent is from 0.01 to 2 parts by weight per 100 parts of the rubber component and said metal or metal compound is selected from the group consisting of cobalt, cobalt alloys containing higher than 50% by weight of cobalt, cobalt oxides, cobalt nitrides, and cobalt carbides, and wherein in the vulcanization step, the amount of the vulcanizing agent and the vulcanization accelerator are determined so as to control the slope of a vulcanization curve of the rubber compound and the amount of cobalt in the bonding layer is selected to satisfy the following equation:

$$x-19 \geq y \geq 0.2x-12$$

wherein x is the amount (atom %) of cobalt in the bonding layer, and y is the slope (kgf·cm/min) of the vulcanization curve of the rubber compound, thereby obtaining a rubber composition material having an adhesion of rubber failure between the rubber compound and the bonding layer in a wet state, as measured by the T-peel method, of 100%.

* * * * *